US012803168B2

(12) United States Patent
Kajikiya et al.

(10) Patent No.: US 12,803,168 B2
(45) Date of Patent: Nov. 17, 2026

(54) ANTENNA MODULE

(71) Applicant: TDK Corporation, Tokyo (JP)

(72) Inventors: Shoma Kajikiya, Tokyo (JP); Tomohiro Moriki, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 700 days.

(21) Appl. No.: 18/172,650

(22) Filed: Feb. 22, 2023

(65) Prior Publication Data

US 2023/0275351 A1 Aug. 31, 2023

(30) Foreign Application Priority Data

Feb. 28, 2022 (JP) ................................ 2022-029828

(51) Int. Cl.
*H01Q 7/00* (2006.01)
*G06K 19/07* (2006.01)
*G06K 19/077* (2006.01)

(52) U.S. Cl.
CPC ........... *H01Q 7/00* (2013.01); *G06K 19/0723* (2013.01); *G06K 19/07749* (2013.01)

(58) Field of Classification Search
CPC .. H01Q 7/00; H01Q 1/38; H01Q 7/06; G06K 19/0723; G06K 19/07749; G06K 19/07; G06K 7/00; H04B 5/263; H04B 5/26
See application file for complete search history.

(56) References Cited

U.S. PATENT DOCUMENTS

| | | | | |
|---|---|---|---|---|
| 6,667,092 | B1 * | 12/2003 | Brollier .................. | G06K 19/02 206/459.1 |
| 8,297,517 | B2 * | 10/2012 | Shingu ..................... | H01Q 7/00 257/679 |
| 9,559,421 | B2 * | 1/2017 | Nakamura ............... | H01Q 7/00 |
| 9,812,774 | B2 * | 11/2017 | Jang ........................ | H01Q 1/526 |
| 10,193,211 | B2 * | 1/2019 | Finn ........................ | H01Q 7/005 |
| 2009/0315320 | A1 * | 12/2009 | Finn ......................... | H01Q 1/38 156/196 |
| 2013/0222198 | A1 * | 8/2013 | Kojima .................... | H01Q 1/22 343/788 |
| 2015/0097521 | A1 * | 4/2015 | Endou ..................... | H01F 38/14 320/108 |
| 2015/0325362 | A1 * | 11/2015 | Kumura .................. | H01F 38/14 336/84 M |
| 2015/0340754 | A1 | 11/2015 | Asou et al. | |

(Continued)

FOREIGN PATENT DOCUMENTS

| | | | |
|---|---|---|---|
| JP | 2011-124512 | A | 6/2011 |
| JP | 2013-211831 | A | 10/2013 |

(Continued)

*Primary Examiner* — Alexander H Taningco
(74) *Attorney, Agent, or Firm* — XSENSUS LLP

(57) ABSTRACT

Disclosed herein is an antenna module that includes a coil pattern planarly wound in a plurality of turns; a first adhesive layer attached to a first surface of the coil pattern in an axial direction of the coil pattern; a second adhesive layer attached to a second surface of the coil pattern in the axial direction of the coil pattern, the second surface being opposite to the first surface; and a magnetic member attached to the first adhesive layer such that the first adhesive layer is sandwiched between the coil pattern and the magnetic member. The first and second adhesive layers bulge to a gap between adjacent patterns of the coil pattern.

19 Claims, 8 Drawing Sheets

(56) References Cited

U.S. PATENT DOCUMENTS

| | | | | |
|---|---|---|---|---|
| 2017/0213644 | A1* | 7/2017 | Lee | H01F 27/2871 |
| 2018/0123228 | A1* | 5/2018 | Yosui | H01Q 1/52 |
| 2018/0130596 | A1* | 5/2018 | Yamaguchi | H01F 27/2804 |
| 2018/0219291 | A1* | 8/2018 | Lim | H01Q 9/0407 |
| 2021/0350198 | A1* | 11/2021 | Finn | G06K 19/07722 |
| 2024/0170846 | A1* | 5/2024 | Gu | H01Q 1/50 |

FOREIGN PATENT DOCUMENTS

| | | | | | |
|---|---|---|---|---|---|
| JP | 2013236267 | A | * | 11/2013 | |
| JP | 5412594 | B1 | * | 2/2014 | |
| JP | 2014116921 | A | * | 6/2014 | |
| JP | 2015-220719 | A | | 12/2015 | |
| JP | 2017-508333 | A | | 3/2017 | |
| KR | 101458176 | B1 | * | 11/2014 | H01Q 1/243 |

* cited by examiner

ANTENNA MODULE

CROSS-REFERENCE TO RELATED APPLICATION

This application claims the benefit of Japanese Patent Application No. 2022-029828, filed on Feb. 28, 2022, the entire disclosure of which is incorporated by reference herein.

BACKGROUND

The present disclosure relates to an antenna module. JP 2013-236267A discloses a method of manufacturing an antenna module. The method includes attaching an adhesive layer to a coil pattern formed on the surface of a substrate, removing the substrate, and attaching a magnetic member in place of the substrate. Accordingly, a final product does not include the substrate, thereby achieving thinning of the antenna module.

However, in the antenna module described in JP 2013-236267A, a large irregularity occurs in the adhesive layer, so that when the antenna module is attached to an object, flatness is lost.

SUMMARY

An antenna module according to the present disclosure includes: a coil pattern planarly wound in a plurality of turns; a first adhesive layer attached to one surface of the coil pattern in the axial direction of the coil pattern; a second adhesive layer attached to the other surface of the coil pattern in the axial direction of the coil pattern; and a magnetic member attached to the first adhesive layer and disposed on the side opposite to the coil pattern with respect to the first adhesive layer. The first and second adhesive layers bulge to a gap between the patterns of the coil pattern. This makes it possible to ensure high flatness and to prevent a progressive short-circuit failure.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure to provide an antenna module capable of ensuring flatness.

Preferred embodiments of the present disclosure will be explained below in detail with reference to the accompanying drawings.

Figure 1:
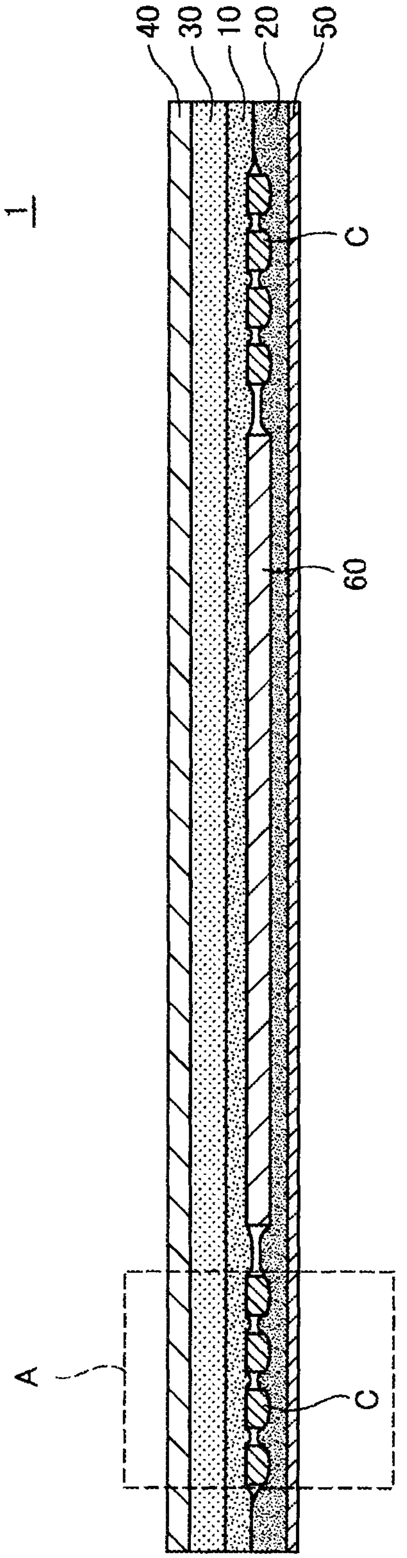
FIG. 1 is a schematic cross-sectional view for explaining the structure of an antenna module 1 according to a first embodiment of the present disclosure.

FIG. 1 is a schematic cross-sectional view for explaining the structure of an antenna module 1 according to a first embodiment of the present disclosure.

As illustrated in FIG. 1, the antenna module 1 according to the first embodiment includes a coil pattern C planarly wound in a plurality of turns, a first adhesive layer 10 attached to one surface of the coil pattern C in the axial direction of the coil pattern C, a second adhesive layer 20 attached to the other surface of the coil pattern C in the axial direction thereof, a magnetic member 30 attached to the first adhesive layer 10 and disposed on the side opposite to the coil pattern C with respect to the first adhesive layer 10, a metal member 40 disposed on the side opposite to the first adhesive layer 10 with respect to the magnetic member 30, and a liner layer 50 attached to the second adhesive layer 20 and disposed on the side opposite to the coil pattern C with respect to the second adhesive layer 20.

The antenna module 1 is connected to, for example, a not-shown near field wireless communication (NFC) circuit to function as an NEC antenna coil that performs near field wireless communication with a communication target device. The antenna module 1 also functions as a wireless power transmission coil that performs wireless power feeding using a frequency band (e.g., 13.56 MHz) of the near field wireless communication. Further, the antenna module 1 can be made to function as a coil that performs both the near field wireless communication and wireless power feeding.

Figure 2:
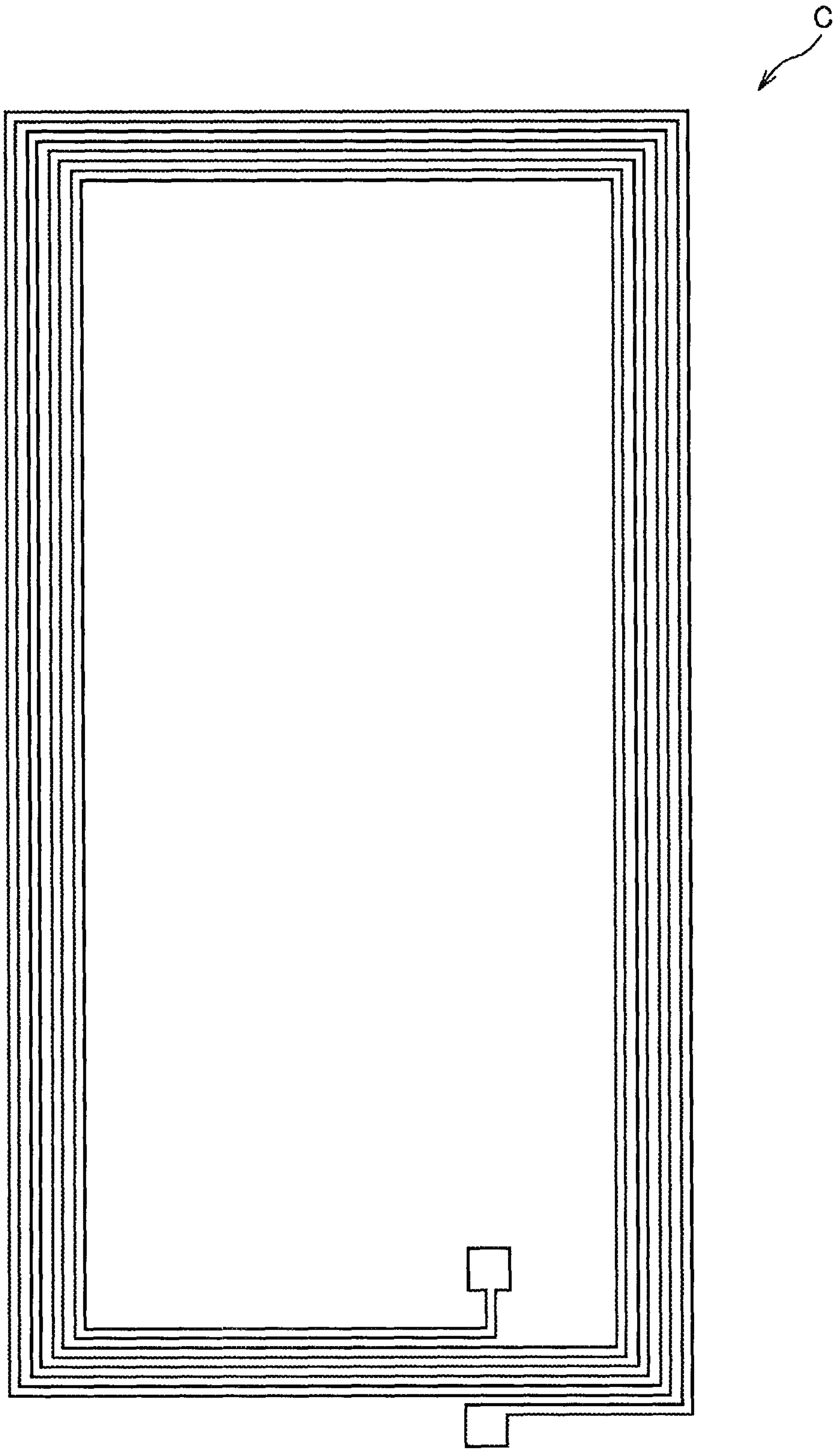
FIG. 2 is a plan view of the coil pattern C.

As illustrated in FIG. 2, which is a plan view, the coil pattern C is a planar spiral conductor pattern wound in a plurality of turns and is made of a good conductor such as copper. The coil pattern C is wound with a gap interposed between adjacent turns. The number of turns of the coil patterns C is four in the example illustrated in FIGS. 1 and 2, but not limited thereto. Further, the planar shape of the coil pattern C is not particularly limited to rectangle but may be a circle or an ellipse.

Figure 3:
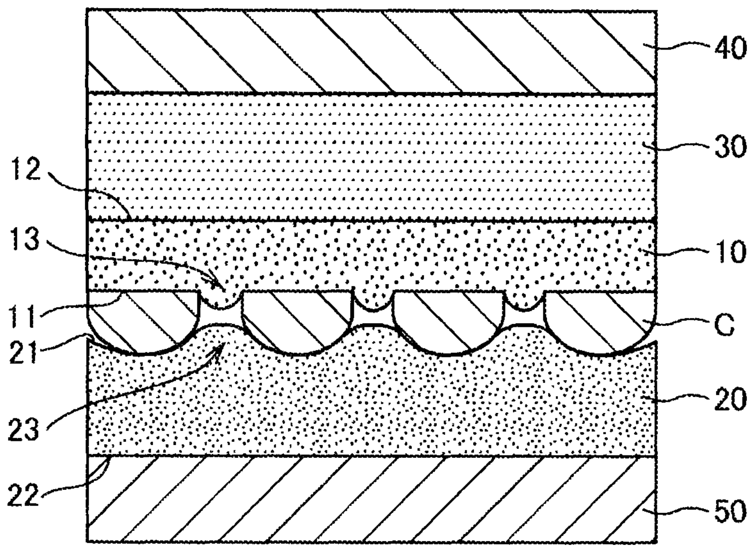
FIG. 3 is a schematic enlarged cross-sectional view of an area A illustrated in FIG. 1.

FIG. 3 is a schematic enlarged cross-sectional view of an area A illustrated in FIG. 1.

As illustrated in FIG. 3, the first adhesive layer 10 has an adhesive surface 11 attached to the coil pattern C and an adhesive surface 12 attached to the magnetic member 30. This allows the coil pattern C and magnetic member 30 to be fixed to each other by the first adhesive layer 10. The first adhesive layer 10 may be a pressure sensitive adhesive having heat resistance, such as an acrylic adhesive, a silicon adhesive, a urethane adhesive, or a rubber adhesive. The magnetic member 30 is a member serving as a magnetic path for a magnetic field generated from the coil pattern C and may be a cured paste member which is a mixture of magnetic particles and resin or a sheet-like member. In actual use, the antenna module 1 is disposed with respect to a communication target device such that the coil pattern C is positioned between the communication target device and the magnetic member 30. The metal member 40 plays a role of reflecting electromagnetic wave noise mainly in a high frequency region.

The second adhesive layer 20 has an adhesive surface 21 attached to the coil pattern C and an adhesive surface 22 attached to the liner layer 50. This allows the coil pattern C and liner layer 50 to be fixed to each other by the second adhesive layer 20. The second adhesive layer 20 may be a pressure sensitive adhesive having heat resistance, such as an acrylic adhesive, a silicon adhesive, a urethane adhesive, or a rubber adhesive. The liner layer 50 is removed when the antenna module 1 according to the present embodiment is mounted on a communication device. That is, the liner layer 50 plays a role of covering the adhesive surface 22 of the second adhesive layer 20 in a state before the antenna module 1 is mounted on a communication device. Then, the liner layer 50 is removed upon mounting of the antenna module 1 according to the present embodiment on the communication device to expose the adhesive surface 22 of the second adhesive layer 20, and the exposed adhesive surface 22 is attached to the communication device.

As described above, the antenna module 1 according to the present embodiment has a structure in which the coil pattern C is sandwiched between the first and second adhesive layers 10 and 20 from both sides in the coil axis direction. Further, as illustrated in FIG. 3, the first adhesive layer 10 has a bulging part 13 bulging to a gap between the patterns of the coil pattern C, and the second adhesive layer 20 has a bulging part 23 bulging to a gap between the patterns of the coil pattern C. The bilging parts 13 and 23 are generated by deformation of the first and second adhesive layers 10 and 20, respectively, and are each brought into contact with a part of the side surface of the coil pattern C, whereby adhesion between the coil pattern C and the first and second adhesive layers 10 and 20 is enhanced. In addition, the bulging parts 13 and 23 enter the gap between the patterns of the coil pattern C, so that minor metal residue that may remain between the patterns depending on manufacturing conditions does not move but is fixed by the bulging parts 13 and 23. This makes it possible to prevent a progressive short-circuit failure caused by such metal residue. The bulging parts 13 and 23 may contact each other between the patterns of the coil pattern C.

Figure 4:
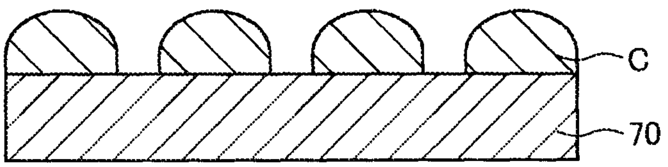
FIGS. 4 and 5 are schematic diagrams for explaining a manufacturing process of the antenna module 1.
Figure 5:
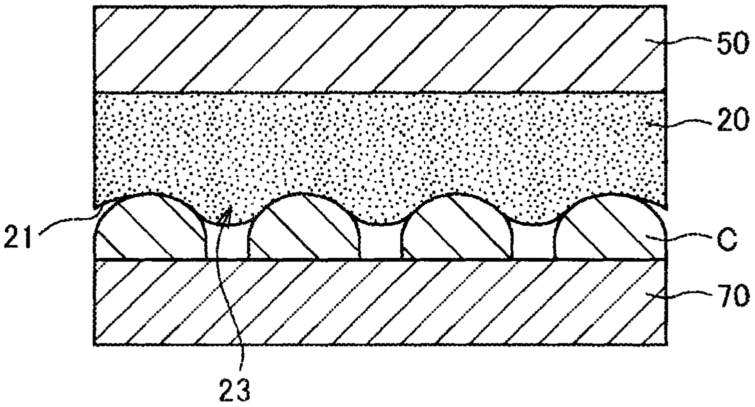

The coil pattern C has such a sectional shape that the pattern width thereof increases toward the first adhesive layer 10. However, the coil pattern C need not necessarily vary in pattern width over the entire cross section but may partly include a portion whose pattern width does not vary. This is due to a manufacturing process. That is, in manufacturing of the antenna module 1 according to the present embodiment, first the coil pattern C is formed on the surface of an insulating substrate 70 made of PET (Poly Ethylene Terephthalate) or the like as illustrated in FIG. 4. At this time, the coil pattern C slightly decreases in pattern width as it separates from the substrate 70. Then, as illustrated in FIG. 5, a laminated body of the second adhesive layer 20 and liner layer 50 is prepared, and the adhesive surface 21 of the second adhesive layer 20 is pressed against the coil pattern C so as to attach the laminated body and the coil pattern C to each other. At this time, the second adhesive layer 20 is deformed to generate the bulging part 23 between the patterns of the coil pattern C. Thereafter, after removal of the substrate 70, a laminated body of the first adhesive layer 10, magnetic member 30, and metal member 40 is prepared, and the adhesive surface 11 of the first adhesive layer 10 is pressed against the coil pattern C so as to attach the laminated body and the coil pattern C to each other. At this time, the first adhesive layer 10 is deformed to generate the bulging part 13 between the patterns of the coil pattern C.

At the time when the first adhesive layer 10 is attached to one surface of the coil pattern C, the second adhesive layer 20 already exists on the other surface of the coil pattern C, so that displacement is distributed vertically so as to be the deformation of the first adhesive layer 10 and the deformation of the second adhesive layer 20, thereby ensuring high flatness of the antenna module 1.

The coil pattern C decreases in pattern width as it approaches the second adhesive layer 20, so that even when the first and second adhesive layers 10 and 20 are made of the same material, the second adhesive layer 20 is larger in the bulging amount than the first adhesive layer 10, with the result that the flatness of the adhesive surface 22 of the second adhesive layer 20 deteriorates. To suppress this, the first adhesive layer 10 may be made smaller in thickness than the second adhesive layer 20. This allows a sufficient degree of flatness of the adhesive surface 22 to be ensured even when the bulging amount of the second adhesive layer 20 is large. On the other hand, the first adhesive layer 10 is small in bulging amount, so that even when it is smaller in thickness than the second adhesive layer 20, the flatness of the adhesive surface 12 is ensured, whereby a variation in the distance between the coil pattern C and the magnetic member 30 can be suppressed. The bulging amount of the first adhesive layer 10 refers to the protruding amount from the interface between the adhesive surface 11 of the first adhesive layer 10 and the coil pattern C toward the second adhesive layer 20, and the bulging amount of the second adhesive layer 20 refers to the protruding amount from a part of the interface between the adhesive surface 21 of the second adhesive layer 20 and the coil pattern C that is closest to the liner layer 50 toward the first adhesive layer 10.

As described above, the antenna module 1 according to the present embodiment does not include a substrate, thereby achieving thinning. Further, in the antenna module 1 according to the present embodiment, the coil pattern C is sandwiched between the first and second adhesive layers 10 and 20 from both sides in the axial direction of the coil, so that it is possible to ensure high flatness and to prevent a progressive short-circuit failure caused by metal residue.

To further achieve higher flatness, a non-conductive member 60 may be disposed in the opening of the coil pattern C, as illustrated in FIG. 1. The non-conductive member 60 is made of, e.g., a resin material having heat resistance and is attached to at least one of the first and second adhesive layers 10 and 20 to be fixed in the opening of the coil pattern C. Attaching the non-conductive member 60 to both the first and second adhesive layers 10 and 20 allows the coil pattern C and first and second adhesive layers 10 and 20 to be fixed more firmly. When the thickness of the non-conductive member 60 is made equal to the thickness of the coil pattern C, the first and second adhesive layers 10 and 20 each have no recess at a part thereof that overlaps the opening of the coil pattern C, thereby achieving a higher degree of flatness.

When there is a need for the antenna module 1 to have sufficient flexibility, a material having a Young's modulus lower than that of a metal material constituting the coil pattern C may be used. This makes it possible to suppress deterioration in flexibility due to the use of the non-conductive member 60.

When the planar size of the non-conductive member 60 is made substantially the same as that of the opening area of the coil pattern C, a higher degree of flatness can be obtained.

Figure 6:
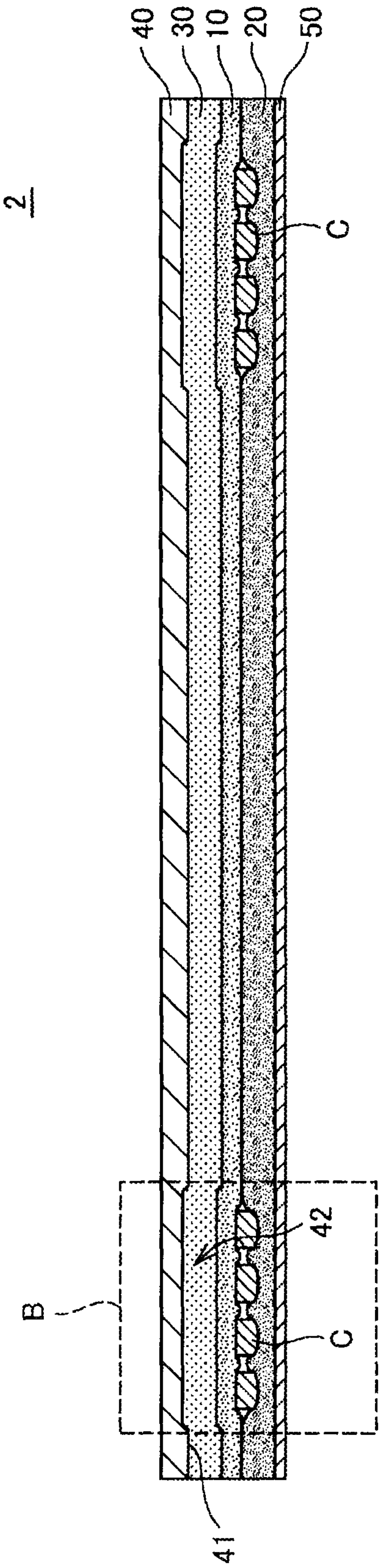
FIG. 6 is a schematic cross-sectional view for explaining the structure of an antenna module 2 according to a second embodiment of the present disclosure.
Figure 7:
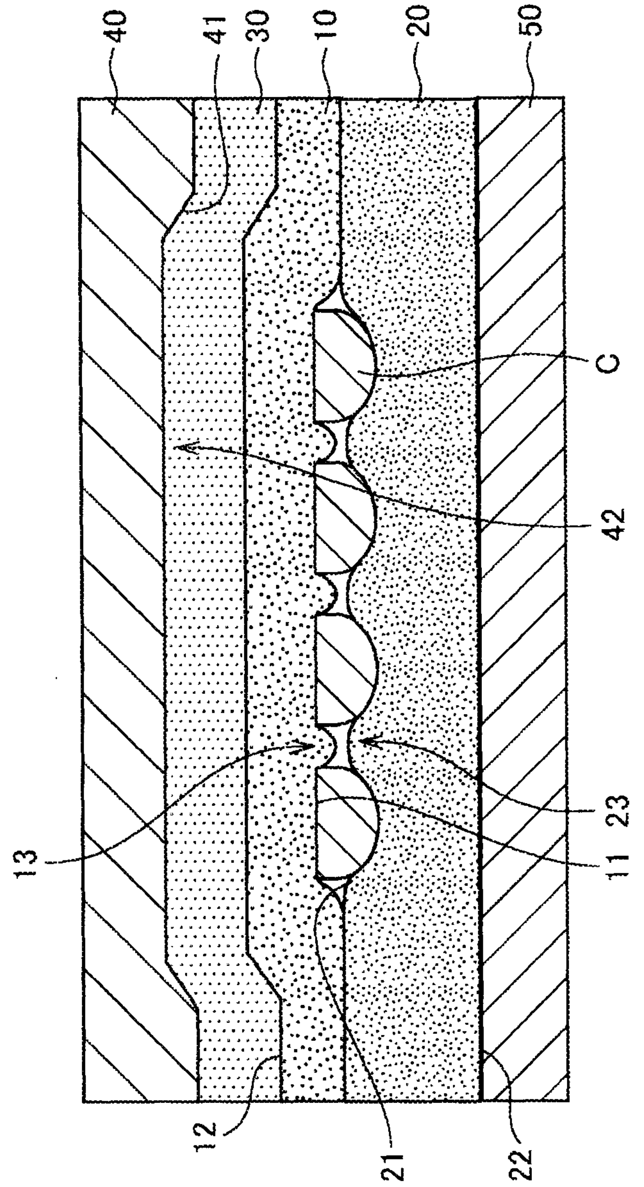
FIG. 7 is a schematic enlarged cross-sectional view of an area B illustrated in FIG. 6.

Alternatively, like an antenna module 2 according to a second embodiment illustrated in FIG. 6, a recess 42 corresponding to the pattern shape of the coil pattern C may be formed in an inner surface 41 of the metal member 40 on the magnetic member 30 side. Thus, as illustrated in FIG. 7 which is a schematic enlarged cross-sectional view of an area B illustrated in FIG. 6, the first adhesive layer 10 and magnetic member 30 are deformed toward the metal member 40 side at an area where the coil pattern C is provided, so that irregularity caused due to the thickness of the coil pattern C can be absorbed by the recess 42.

In the recess 42, the first adhesive layer 10 and magnetic member 30 are deformed toward the metal member 40 into a mountain shape, so that by forming the recess in a wider area than the winding width from the inner edge of the innermost turn to the outer edge of the outermost turn of the coil pattern C, the entire deformed part of each of the first adhesive layer 10 and magnetic member 30 can be absorbed.

Figure 8:
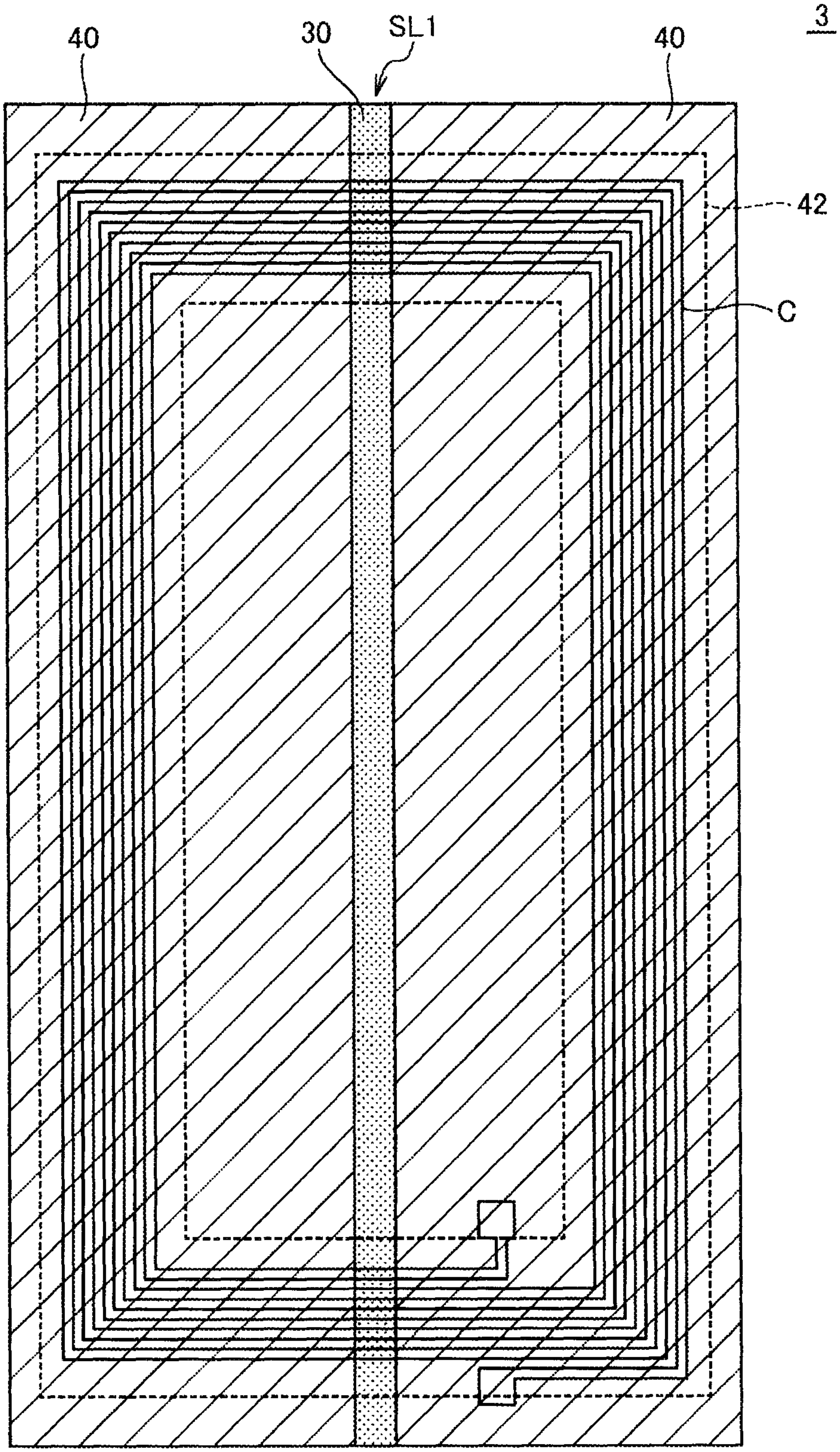
FIG. 8 is a schematic plan view for explaining the structure of an antenna module 3 according to a third embodiment of the present disclosure.

FIG. 8 is a schematic plan view for explaining the structure of an antenna module 3 according to a third embodiment of the present disclosure, which is viewed from the metal member 40 side.

The antenna module 3 according to the third embodiment illustrated in FIG. 8 differs from the antenna module 2 according to the second embodiment in that a slit SL1 is formed in the metal member 40. Other basic configurations are the same as those of the antenna module 2 according to the second embodiment, so the same reference numerals are given to the same elements, and overlapping description will be omitted. The slit SL1 is formed so as to divide the metal member 40 into two. Forming such a slit SL1 divides an eddy current at this portion. This suppresses the generation of a demagnetizing field and which in turn can suppress deterioration in communication characteristics.

Figure 9:
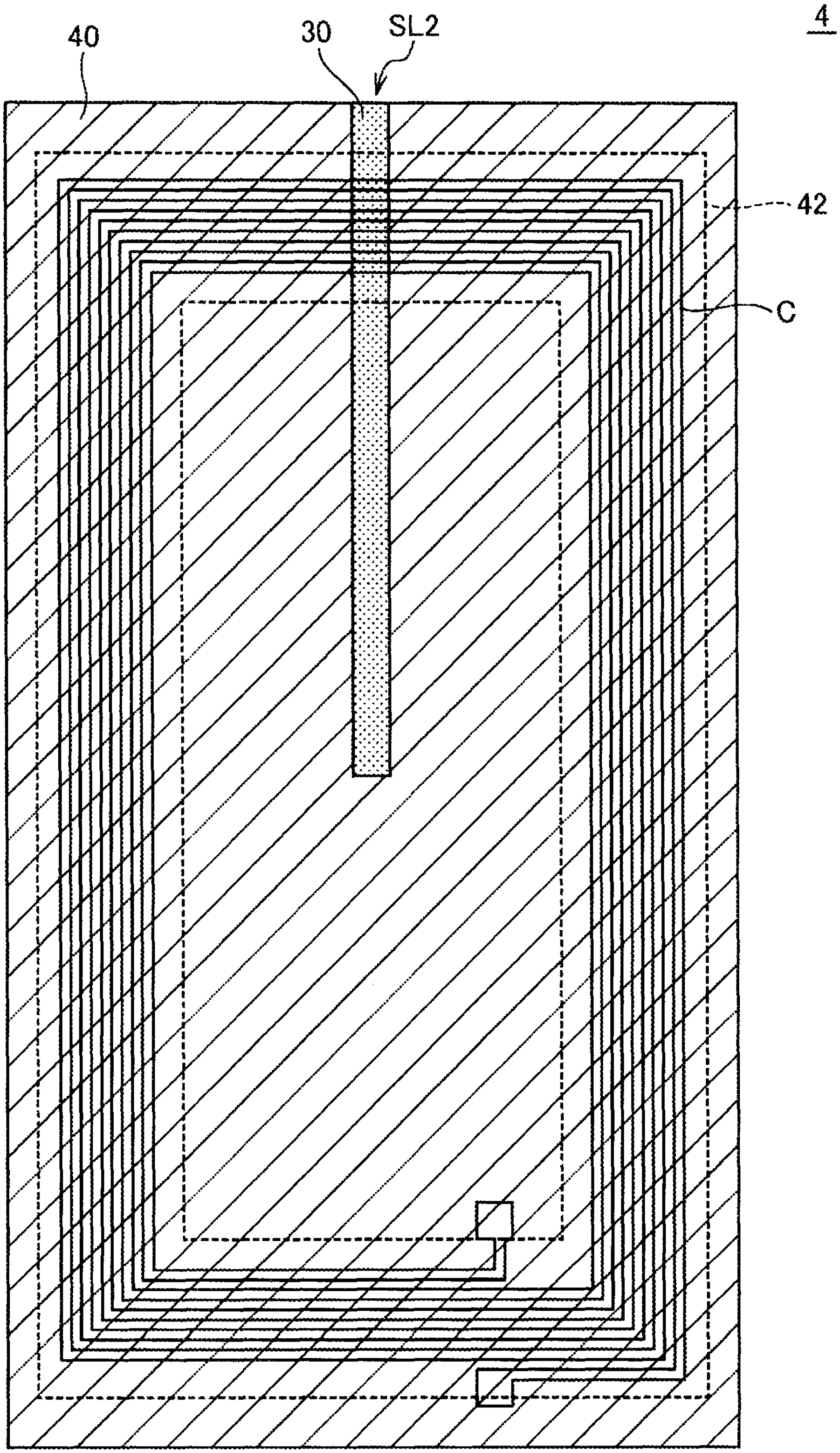
FIG. 9 is a schematic plan view for explaining the structure of an antenna module 4 according to a fourth embodiment of the present disclosure.

FIG. 9 is a schematic plan view for explaining the structure of an antenna module 4 according to a fourth embodiment of the present disclosure, which is viewed from the metal member 40 side.

The antenna module 4 according to the fourth embodiment illustrated in FIG. 9 differs from the antenna module 2 according to the second embodiment in that a slit SL2 is formed in the metal member 40. Other basic configurations are the same as those of the antenna module 2 according to the second embodiment, so the same reference numerals are given to the same elements, and overlapping description will be omitted. The slit SL2 is formed so as not to completely divide the metal member 40 but to divide one surface of the metal member 40. Forming such a slit SL2 partly inverses the direction of an eddy current. This suppresses the generation of a demagnetizing field and which in turn can suppress deterioration in communication characteristics.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

An antenna module according to the present disclosure includes: a coil pattern planarly wound in a plurality of turns; a first adhesive layer attached to one surface of the coil pattern in the axial direction of the coil pattern; a second adhesive layer attached to the other surface of the coil pattern in the axial direction of the coil pattern; and a magnetic member attached to the first adhesive layer and disposed on the side opposite to the coil pattern with respect to the first adhesive layer. The first and second adhesive layers bulge to a gap between the patterns of the coil pattern. This makes it possible to ensure high flatness and to prevent a progressive short-circuit failure.

The antenna module according to the present disclosure may further include a non-conductive member disposed in the opening of the coil pattern and attached to at least one of the first and second adhesive layers. This makes it possible to prevent a recess from occurring at a part overlapping the opening of the coil pattern. The non-conductive member may be attached to both the first and second adhesive layers. This allows the coil pattern and the first and second adhesive layers to be fixed to each other more firmly. The thickness of the non-conductive member may be equal to the thickness of the coil pattern. This makes it possible to achieve a higher degree of flatness. Further, the Young's modulus of the non-conductive member may be lower than that of a metal material constituting the coil pattern. This makes it possible to ensure the flexibility of the entire antenna module.

The coil pattern may have such a sectional shape that the pattern width thereof increases toward the first adhesive layer, and the first adhesive layer may be smaller in thickness than the second adhesive layer. This makes it possible to suppress deterioration in flatness due to the presence of the bulging part. In this case, the bulging amount of the second adhesive layer between the patterns may be larger than the bulging amount of the first adhesive layer between the patterns. This makes it possible to suppress a variation in the distance between the coil pattern and the magnetic member.

The antenna module according to the present disclosure may further include a metal member disposed on the side opposite to the first adhesive layer with respect to the magnetic member. This makes it possible to reflect electromagnetic wave noise mainly in a high frequency region. In this case, a recess corresponding to the pattern shape of the coil pattern may be formed in the inner surface of the metal member on the magnetic member side. This makes it possible to prevent a recess from occurring at a part overlapping the opening of the coil pattern. Further, a slit may be formed in the metal member. This suppresses the generation of a demagnetizing field and which in turn can suppress deterioration in communication characteristics.

What is claimed is:

1. An antenna module comprising:

a coil pattern planarly wound in a plurality of turns;

a first adhesive layer attached to a first surface of the coil pattern in an axial direction of the coil pattern;

a second adhesive layer attached to a second surface of the coil pattern in the axial direction of the coil pattern, the second surface being opposite to the first surface; and a magnetic member attached to the first adhesive layer such that the first adhesive layer is sandwiched between the coil pattern and the magnetic member, wherein the first and second adhesive layers bulge to a gap between adjacent turns of the coil pattern, wherein the coil pattern has such a sectional shape that a pattern width thereof increases toward the first adhesive layer, and wherein the first adhesive layer is smaller in thickness than the second adhesive layer.

2. The antenna module as claimed in claim 1, further comprising a non-conductive member disposed in an opening of the coil pattern and attached to at least one of the first and second adhesive layers.

3. The antenna module as claimed in claim 2, wherein the non-conductive member is attached to both the first and second adhesive layers.

4. The antenna module as claimed in claim 2, wherein a thickness of the non-conductive member is substantially equal to a thickness of the coil pattern.

5. The antenna module as claimed in claim 2, wherein a Young's modulus of the non-conductive member is lower than that of a metal material constituting the coil pattern.

6. The antenna module as claimed in claim 2, wherein the non-conductive member comprises a resin material having heat resistance, and is configured to prevent a recess at a part overlapping the opening of the coil pattern.

7. The antenna module as claimed in claim 2, wherein the non-conductive member has a planar size substantially equal to an opening area of the coil pattern to enhance flatness.

8. The antenna module as claimed in claim 1, wherein a bulging amount of the second adhesive layer between the adjacent turns is larger than a bulging amount of the first adhesive layer between the adjacent turns.

9. The antenna module as claimed in claim 8, wherein the bulging amount of the second adhesive layer is larger than the bulging amount of the first adhesive layer to suppress a variation in a distance between the coil pattern and the magnetic member.

10. The antenna module as claimed in claim 1, wherein the magnetic member comprises a mixture of magnetic particles and resin, and is configured to serve as a magnetic path for a magnetic field generated by the coil pattern.

11. The antenna module as claimed in claim 1, wherein the sectional shape of the coil pattern decreases in width as it approaches the second adhesive layer, and bulging parts of the first and second adhesive layers contact a side surface of the coil pattern.

12. The antenna module as claimed in claim 1, further comprising a liner layer attached to the second adhesive layer on a side opposite to the coil pattern, wherein the liner layer is configured to be removed to expose an adhesive surface of the second adhesive layer for mounting the antenna module.

13. An antenna module comprising:

a coil pattern planarly wound in a plurality of turns;

a first adhesive layer attached to a first surface of the coil pattern in an axial direction of the coil pattern;

a second adhesive layer attached to a second surface of the coil pattern in the axial direction of the coil pattern, the second surface being opposite to the first surface;

a magnetic member attached to the first adhesive layer such that the first adhesive layer is sandwiched between the coil pattern and the magnetic member; and a metal member disposed such that the magnetic member is sandwiched between the first adhesive layer and the metal member, wherein the first and second adhesive layers bulge to a gap between adjacent turns of the coil pattern.

14. The antenna module as claimed in claim 13, wherein an inner surface of the metal member on the magnetic member side has a recess corresponding to a pattern shape of the coil pattern.

15. The antenna module as claimed in claim 14, wherein the recess in the metal member accommodates deformation of the first adhesive layer and the magnetic member toward the metal member at a region corresponding to the coil pattern.

16. The antenna module as claimed in claim 13, wherein a slit is formed in the metal member.

17. The antenna module as claimed in claim 16, wherein the slit is configured to divide an eddy current in the metal member to suppress generation of a demagnetizing field.

18. The antenna module as claimed in claim 13, wherein the metal member is configured to reflect electromagnetic wave noise in a high-frequency region.

19. An antenna module comprising:

a coil pattern planarly wound in a plurality of turns;

a first adhesive layer attached to a first surface of the coil pattern in an axial direction of the coil pattern;

a second adhesive layer attached to a second surface of the coil pattern in the axial direction of the coil pattern, the second surface being opposite to the first surface;

a magnetic member attached to the first adhesive layer such that the first adhesive layer is sandwiched between the coil pattern and the magnetic member; and a non-conductive member disposed in an opening of the coil pattern and attached to at least one of the first and second adhesive layers, wherein the first and second adhesive layers bulge to a gap between adjacent turns of the coil pattern, and wherein the non-conductive member is attached to both the first and second adhesive layers to fix the coil pattern relative to the first and second adhesive layers.

* * * * *